(12) United States Patent
Sun et al.

(10) Patent No.: US 12,293,252 B2
(45) Date of Patent: May 6, 2025

(54) ENCODING ELEMENT AND ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Kai Sun, Beijing (CN); Dong Yang, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 0 days.

(21) Appl. No.: 18/556,585

(22) PCT Filed: Dec. 30, 2021

(86) PCT No.: PCT/CN2021/143395
§ 371 (c)(1),
(2) Date: Oct. 20, 2023

(87) PCT Pub. No.: WO2022/222542
PCT Pub. Date: Oct. 27, 2022

(65) Prior Publication Data
US 2024/0211711 A1    Jun. 27, 2024

(30) Foreign Application Priority Data

Apr. 20, 2021    (CN) .......................... 202110426270.9

(51) Int. Cl.
*G06K 7/14*    (2006.01)
*B42D 25/23*    (2014.01)
(Continued)

(52) U.S. Cl.
CPC ......... *G06K 7/1417* (2013.01); *B42D 25/378* (2014.10); *G06K 19/06037* (2013.01);
(Continued)

(58) Field of Classification Search
CPC .. G06K 7/1417; G06K 7/14; G06K 19/06037; G06K 19/06; B42D 25/378;
(Continued)

(56) References Cited

U.S. PATENT DOCUMENTS 6,808,806 B2    10/2004    Phillips et al.
8,376,409 B2 *    2/2013    Rosset .................. D21H 21/42
                                                  162/103
(Continued)

FOREIGN PATENT DOCUMENTS

CN    1417732 A    5/2003
CN    102044191 A    5/2011
(Continued)

*Primary Examiner* — Justin V Lewis
(74) *Attorney, Agent, or Firm* — Shumaker, Loop & Kendrick, LLP; James D. Miller

(57) ABSTRACT

An encoding element and an anti-counterfeiting product. The encoding element includes a printing stock, wherein the printing stock has an encoding area thereon; the encoding area is provided with at least one group of markers, and at least one of the attributes of markers in the same group is the same; and the markers are randomly distributed, such that encoding information of the encoding element is random. By means of the disclosure, an encoding system of "one object, one code" is realized, and the uniqueness of encoding is realized by means of random encoding information, which cannot be preset.

16 Claims, 3 Drawing Sheets

(51) Int. Cl.
*B42D 25/29* (2014.01)
*B42D 25/328* (2014.01)
*B42D 25/342* (2014.01)
*B42D 25/369* (2014.01)
*B42D 25/378* (2014.01)
*G06K 19/06* (2006.01)

(52) U.S. Cl.
CPC .............. *B42D 25/23* (2014.10); *B42D 25/29* (2014.10); *B42D 25/328* (2014.10); *B42D 25/342* (2014.10); *B42D 25/369* (2014.10)

(58) Field of Classification Search
CPC ...... B42D 25/23; B42D 25/29; B42D 25/328; B42D 25/342; B42D 25/369
USPC ........ 283/72, 73, 74, 79, 81, 82, 83, 94, 98, 283/117, 901
See application file for complete search history.

(56) References Cited

U.S. PATENT DOCUMENTS

| | | |
|---|---|---|
| 2014/0095398 A1 | 4/2014 | Lin |
| 2014/0319815 A1* | 10/2014 | Sekine ................... B42D 25/41 283/85 |
| 2020/0218953 A1 | 7/2020 | Pohjola |
| 2020/0311365 A1 | 10/2020 | Cottrill et al. |

FOREIGN PATENT DOCUMENTS

| | | |
|---|---|---|
| CN | 102501500 A | 6/2012 |
| CN | 106446866 A | 2/2017 |
| CN | 107995894 A | 5/2018 |
| CN | 108422764 A | 8/2018 |
| CN | 109034327 A | 12/2018 |
| EP | 1719636 A1 | 11/2006 |
| JP | 2007090448 A | 4/2007 |
| WO | 2015113718 A1 | 8/2015 |
| WO | 2016193252 A1 | 12/2016 |

* cited by examiner

| 1 | 0 | 0 | 0 | 0 | 0 | 0 | 0 | 0 | 0 |
|---|---|---|---|---|---|---|---|---|---|
| 0 | 0 | 0 | 0 | 0 | 1 | 0 | 0 | 0 | 0 |
| 0 | 0 | 1 | 0 | 0 | 0 | 0 | 1 | 0 | 0 |
| 0 | 0 | 0 | 0 | 1 | 0 | 0 | 1 | 0 | 0 |
| 0 | 0 | 0 | 0 | 0 | 0 | 0 | 0 | 0 | 0 |
| 0 | 1 | 0 | 0 | 0 | 0 | 0 | 0 | 1 | 0 |
| 0 | 0 | 0 | 0 | 1 | 0 | 1 | 0 | 0 | 0 |
| 0 | 1 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 1 | 0 |

Fig. 5

ENCODING ELEMENT AND ANTI-COUNTERFEITING PRODUCT

CROSS REFERENCE TO RELATED PATENT APPLICATIONS

This is a U.S. national phase patent application of PCT/CN2021/143395 filed Dec. 30, 2021 which claims the benefit of and priority to Chinese Patent Application No. 202110426270.9 filed Apr. 20, 2021, the entire contents of each of which are incorporated herein by reference.

TECHNICAL FIELD

The disclosure relates to the field of counterfeiting prevention, and particularly relates to an encoding element and an anti-counterfeiting product.

BACKGROUND

Encoding technology is typically configured on banknotes, financial instruments and other data carriers (for example, value documents or certification documents), and other valuable items (for example, luxury brands) to verify the authenticity of the data carriers and prevent the data carriers from being reproduced without authority. Communication between a verification terminal and a data carrier is established through the network so as to verify the authenticity of the data carrier. At present, in order to establish an encoding system of "one item, one code" for high-volume products, digital printing equipments or coding equipments are needed to produce variable codes. However, such codes may be easily recorded by scanning, photographing, etc. and reproduced in bulk by using commercially available digital printing equipments, thus destroying the "uniqueness" of each code.

SUMMARY

Some embodiments of the disclosure provide an encoding element and an anti-counterfeiting product. By means of the disclosure, an encoding system of "one item, one code" is realized, and the uniqueness of a code is realized by means of random encoding information that may not be preset.

The applicant of the disclosure has found through research that in existing technical methods, in order to establish an encoding system of "one item, one code" for high-volume products, digital printing equipments or coding equipments are needed to produce variable codes. However, such codes are easily recorded by scanning, photographing, etc. and reproduced in bulk by using commercially available digital printing equipments, thus destroying the "uniqueness" of each code.

In order to solve the above-mentioned problems, embodiments of the disclosure provide an encoding element and an anti-counterfeiting product. The encoding element includes: a printing stock, the printing stock has an encoding area; the encoding area is provided with at least one group of markers, and at least one of attributes of markers in the same group of the at least one group of markers is the same; and the markers are randomly distributed, such that encoding information of the encoding element is random.

In an embodiment mode, positions of the markers are randomly distributed in a non-presupposition manner.

In an embodiment mode, the encoding information of the encoding element is obtained based on positions of the markers in the encoding area.

In an embodiment mode, the attributes of the markers include shapes, colors, sizes, graphics, and orientations.

In an embodiment mode, the colors include colors that are observed from different angles.

In an embodiment mode, a transverse size of each of the markers ranges from 20 microns to 1000 microns, preferably from 100 microns to 500 microns, the transverse size being a distance between two points furthest apart on each of the markers; and a thickness of each of the markers ranges from 0.1 micron to 40 microns, preferably from 0.5 microns to 20 microns.

In an embodiment mode, a ratio of the transverse size of each of the markers to the thickness of the markers is greater than 5, preferably greater than 10.

In an embodiment mode, the markers are randomly distributed in the encoding area by means of coating and/or printing.

In an embodiment mode, a plurality of markers are overlapped in the encoding area, a number of the plurality of markers is smaller than a preset value, the preset value being 10% of a number of total markers, preferably 1% of the number of total markers.

In an embodiment mode, the markers include one or more of metal coatings, dielectric coatings and plastic layers.

In an embodiment mode, the encoding element further includes position detection pattern located on the printing stock, the position detection pattern is configured to determine a range of the encoding area.

In an embodiment mode, the encoding element includes at least three position detection patterns.

In an embodiment mode, the encoding area of the encoding element includes at least ten markers.

In an embodiment mode, the encoding element further includes an optically variable anti-counterfeiting element.

In an embodiment mode, the optically variable anti-counterfeiting element is located on the printing stock, preferably, the optically variable anti-counterfeiting element overlaps a position detection pattern and/or the encoding area.

In an embodiment mode, an operating principle of the optically variable anti-counterfeiting element is at least one of grating diffraction, reflection from a micro-reflective surface, surface plasmon resonance absorption, interference, color generation from a fixed height difference, sampling and amplification of micro-lens arrays, and Moire sampling and amplification of periodic micro-lens arrays.

In an embodiment mode, a pigment of the optically variable anti-counterfeiting element is an optically variable pigment and/or an optically variable magnetic pigment.

In an embodiment mode, the printing stock is at least one of paper, plastic and metal.

In an embodiment mode, a size of the encoding area is 1 $mm^2$-1000 $mm^2$, preferably 10 $mm^2$-100 $mm^2$.

Correspondingly, an embodiment of the disclosure further provides an anti-counterfeiting product, the anti-counterfeiting product includes the above encoding element.

In an embodiment mode, the anti-counterfeiting product includes a banknote, identity card, a product packaging, a bank card or a money order.

By means of the above-mentioned technical solutions, according to the disclosure, the uniqueness of the encoding element is realized, the random encoding information that may not be preset is also achieved, and the counterfeiting difficulty is further improved in combination with optical anti-counterfeiting technology, thus improving the security of the encoding element.

Other features and advantages of the embodiments of the disclosure will be described in detail in the following detailed description.

BRIEF DESCRIPTION OF THE DRAWINGS

The accompanying drawings, which are intended to provide a further understanding of the embodiments of the disclosure and constitute a part of the specification, serve to explain the embodiments of the disclosure together with the following description, but do not constitute a limitation on the embodiments of the disclosure. In the figures:

FIG. 5 is a schematic diagram of the specific encoding grids according to an embodiment of the disclosure.

Figure 1:
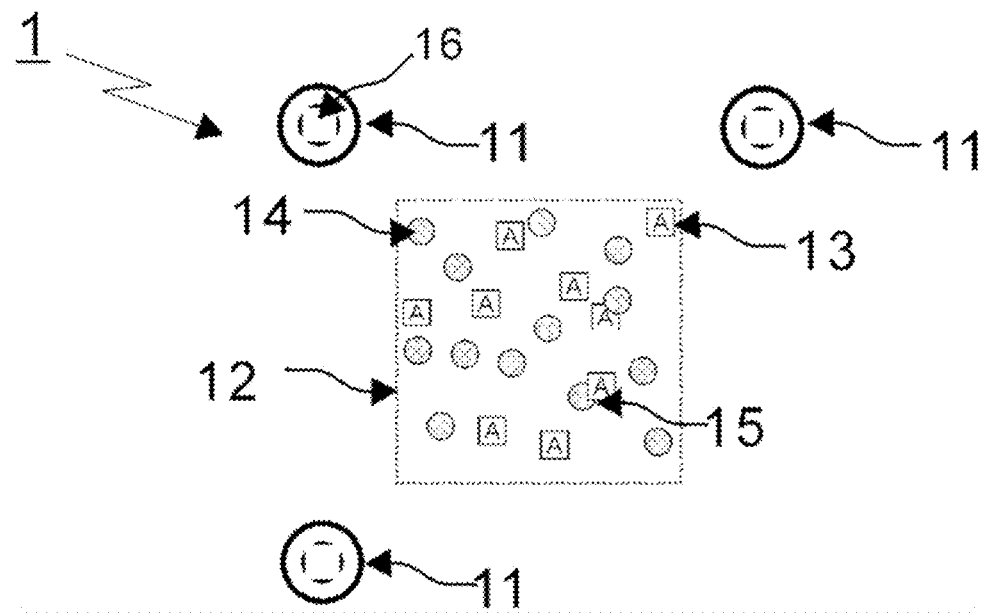
FIG. 1 is a schematic diagram of an encoding element according to an embodiment of the disclosure.

| Description of reference numerals | |
|---|---|
| 1 Encoding element | 11 First position detection pattern |
| 12 First encoding region | 13 First marker |
| 14 Second marker | 15 Overlapping region of two markers |
| 16 First optically variable anti-counterfeiting element | |
| 2 Encoding element | 21 Printing stock |
| 22 Fourth marker | 23 Third marker |
| 3 Encoding element | 31 Second position detection pattern |
| 32 Second encoding region | 33 Markers |
| 34 First grid | 35 Second grid |
| 4 Banknote | 41 Encoding element |
| 42 Second optically variable anti-counterfeiting element | 43 Windowed security thread |

DETAILED DESCRIPTION OF THE EMBODIMENTS

The specific implementations of the embodiments of the disclosure are described in detail below in conjunction with the accompanying drawings. It is to be understood that the specific implementations described herein are merely illustrative and explanatory of the embodiments of the disclosure, and are not restrictive of the embodiments of the disclosure.

FIG. 1 is a schematic diagram of an encoding element according to the disclosure. The encoding element 1 includes: a printing stock, the printing stock has an encoding area. The encoding area is provided with at least one group of markers, and at least one of attributes of markers in the same group of the at least one group of markers is the same. The markers are randomly distributed, such that encoding information of the encoding element 1 is random.

As shown in FIG. 1, an area defined in a block diagram is a first encoding area 12, with a size of 1 $mm^2$ to 1000 $mm^2$, preferably 10 $mm^2$ to 100 $mm^2$. Two groups of the markers are defined in the first encoding area 12: a first marker 13 and a second marker 14. The attributes of the markers include shapes, colors, sizes, graphics, and orientations. The colors include colors that are observed from different angles. An attribute of the first marker 13 is a square marker with a character "A" inside. An attribute of the second marker 14 is a circular marker with a grid pattern. The encoding information of the encoding element 1 is obtained based on positions of the markers in the encoding area.

The markers may be sheet-like objects, with a transverse size preferably greater than 5 times a thickness thereof, thereby achieving an easy-to-control and uniform orientation. As the positions of the markers are randomly distributed in a non-presupposition manner, the markers are prevented from being recorded by other personnel by scanning, photographing, etc. and reproduced in bulk by using commercially available digital printing equipments, thereby achieving the "uniqueness" of each code. The markers need to have a common attribute so as to be distinguished from non-markers during scanning, thereby achieving accurate reading. The common attribute of the markers includes the same shape, the same transverse size, the same graphics on surfaces, the same orientation, the same color in front sides, the same color shifts with the angle, etc. Alternatively, the markers may have multiple the same attributes at the same time, for example, the markers have the same shape, size, color, and orientation. The transverse size of each of the markers ranges from 20 microns to 1000 microns, preferably from 100 microns to 500 microns, and the thickness of each of the markers ranges from 0.1 microns to 40 microns, preferably from 0.5 microns to 20 microns. A ratio of the transverse size of each of the markers to the thickness of each of the markers is greater than 5, preferably greater than 10. The markers may be produced by a craft similar to that used to produce optically variable pigments or optically variable magnetic pigments, that is, multilayer coatings including metal and/or dielectric are produced by vacuum evaporation and then stripped from a substrate to be crushed. The markers produced by such a craft typically have a transverse size of 10 microns to 50 microns and a thickness of 0.1 microns to 2 microns. The markers may also be produced by a cutting manner, that is, a thin film material with a coating or a color layer is cut into tiny sheets through a precision cutting tool, typically with a transverse size of 20 microns to 1000 microns and a thickness of 10 microns to 40 microns, and the sheets produced in such a way typically have plastic layers such as PET, PVC and OPP. The cutting manner may also be performed for crushing a co-extruded film into powder with a size of 20 microns to 1000 microns, the co-extruded film is a laminated layer with multiple high refractive index layers and multiple low refractive index layers alternately arranged. The markers may also be metallic pigments made of copper and zinc alloys, pearlescent pigments including a "mica/metal oxide" structure, glass microsphere powder material with a size of 50 microns to 250 microns, liquid crystal capsule-type pigments, photonic crystal pigments, pigments including metal nano-particles or submicron gratings coated with metal, etc.

The markers may be applied to the encoding area on the printing stock by means of coating and/or printing, which may specifically be silk screen printing, flexographic printing, offset printing, gravure printing and the like. By controlling the solid content of ink including the markers, that is, the marker concentration, a surface density of the markers on printed matter are controlled. When the quantity of the markers is a fixed value, an amount of the ink required may be calculated from the fixed value of the markers and area of the markers. The amount of the ink is an amount of used ink that controls the maximum surface density of the markers on the printed matter. In a coating process or a printing process, a magnetic field may also be applied online to the markers with a magnetic substance, so that the markers are oriented toward a specific direction. After coating or printing, the markers are randomly distributed on the printing stock, and an exact position of each of the markers is not be pre-controlled or preset in the coating process and the printing process. In order to facilitate identification and reading, the markers among themselves are little covered or overlapped. For example, a plurality of markers are overlapped in the encoding area, a number of the plurality of markers is smaller than a preset value. The preset value is 10% of a number of total markers, preferably 1% of the number of total markers.

The encoding element further includes first position detection patterns 11 located on the printing stock. The encoding element includes at least three first position detection patterns 11. The first encoding area 12 is determined by defining a rectangular area based on three first position detection patterns 11. The three first position detection patterns 11 are located at three vertices of a rectangle and are configured to correct rotation, scaling, uneven substrate distortion, lens distortion, and other variables of a scanned image. In some embodiments, according to a standard of a quick response code, three position detection patterns exist at three vertices of a rectangular area, and the three position detection patterns are designed in an alternately light and dark manner. The three position detection patterns may be photographed or scanned for identification by using a variety of equipments.

The markers in the encoding area are overlapped, and an overlapping area 15 of two markers is an overlapping area of the first marker 13 and the second marker 14. In order to achieve accurate encoding and easy reading, a plurality of markers are overlapped in the encoding area, a number of the plurality of markers is smaller than a preset value, the preset value being 10% of a number of total markers, preferably 1% of the number of total markers. The overlapping markers may be omitted and not counted into an encoding sequence during program processing.

An optically variable anti-counterfeiting element is located on the printing stock, preferably, the optically variable anti-counterfeiting element overlaps the position detection patterns and/or the encoding area. A pigment of the optically variable anti-counterfeiting element is an optically variable pigment and/or an optically variable magnetic pigment. The optically variable anti-counterfeiting element uses a color produced by a fixed height difference. An operating principle of the optically variable anti-counterfeiting element is at least one of grating diffraction, reflection from a micro-reflective surface, surface plasmon resonance absorption, interference, color generation from a fixed height difference, sampling and amplification of micro-lens arrays, and Moire sampling and amplification of periodic micro-lens arrays. The optical variable anti-counterfeiting element may be referred to existing application files CN107995894A, 201811109920.11, 201410376973.5, WO2015/113718 A1, U.S. Pat. No. 6,808,806B2, WO2016/193252 A1, etc. The pigment of the optically variable anti-counterfeiting element is the optically variable pigment and/or the optically variable magnetic pigment. In FIG. 1, a first optically variable anti-counterfeiting element 16 overlaps the first position detection pattern 11, and security features such as color shift with angle, dynamic, and three-dimensional may be formed specifically based on the principles of grating diffraction, reflection from a micro-reflective surface, surface plasmon resonance absorption, interference, color generation from a fixed height difference, sampling and amplification by micro-lens arrays, etc. The optically variable magnetic pigment based on the interference principle may form security features such as color shift with angle, dynamic and three-dimensional under an action of a magnetic field, and markers may be arranged in term of the security features. For example, the innermost portions of the position detection patterns are in a raised Fresnel embossing effect, and an outer ring of the embossing is in a holographic dynamic effect. With the presence of the optically variable anti-counterfeiting element, counterfeiting caused by high-resolution photography, scanning, copying, and printing may be effectively prevented.

Figure 2:
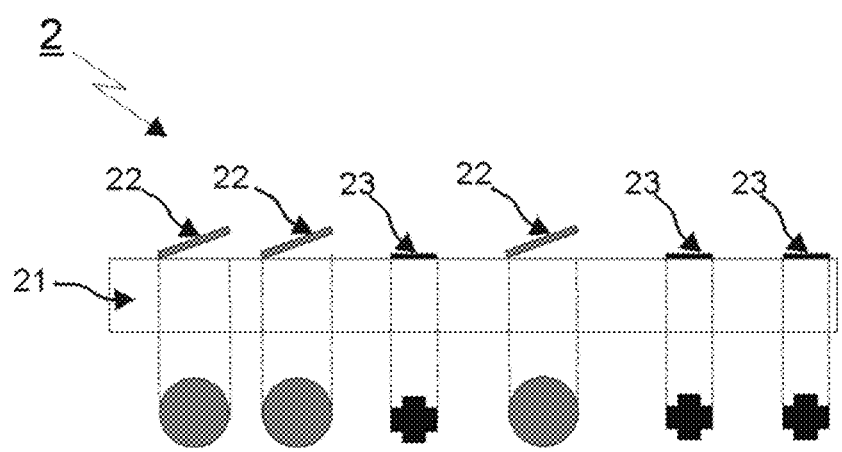
FIG. 2 is a schematic diagram of an encoding element according to another embodiment of the disclosure.

FIG. 2 is a schematic diagram of an encoding element according to the disclosure, which is another embodiment of the encoding element of the disclosure. FIG. 2 shows a side view of an encoding element 2, where two groups of markers are included. One of the two groups of markers are green circular fourth markers 22, and the fourth markers 22 have a preset included angle value with a surface of a printing stock 21. The same attributes of the fourth markers 22 are: the fourth markers are green in color, circular in shape, and have a preset included angle value with the printing stock 21. The other of the two groups of markers are red cross-shaped third markers 23, and the third markers 23 are spread on the surface of the printing stock 21. The same attributes of the third markers 23 are: the third markers are red in color, in a crossed shape, and spread on the surface of the printing stock 21. The printing stock 21 is at least one of paper, plastic and metal. For example, the printing stock 21 is cotton fiber paper with a thickness of 60 microns to 120 microns. In some embodiments, the printing stock 21 may also be a PET plastic film with a thickness of 10 microns to 40 microns. The attributes of markers 21 include shapes, colors, sizes, graphics, and orientations. During code reading, by taking a picture at a specific angle, merely one type of markers are visible, or merely markers of a specific shape or color are read through a program.

Figure 3:
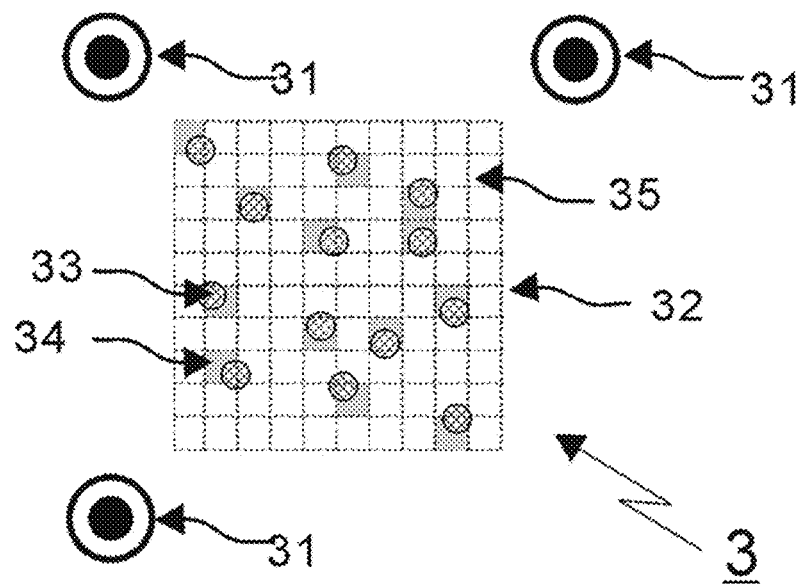
FIG. 3 is a schematic diagram of an encoding method of an encoding element according to the disclosure.

FIG. 3 is a schematic diagram of an encoding method of the encoding element according to the disclosure. To provide a sufficient quantity of possible codes, a size of the encoding area is 1 mm²-1000 mm², preferably 10 mm²-100 mm², and the encoding area of the encoding element includes at least ten markers. One encoding method may be used: code 1 or code 0 is defined for a presence or an absence of the center of a marker in a certain area, and the encoding area is gridded. A size of a grid is related to a size of a marker, preferably 1-3 times the size of the marker. If the center of a marker is located in a certain grid, the certain grid corresponds to the code 1, and a grid corresponds to the code 0 with the absence of the center of a marker. A quantity of codes grows rapidly with a quantity of grids and a quantity of markers. For example, if thirty markers are defined in a net with grids in a 10*10 form, at least $C_{100}^{30} \cdot 3*10^{25}$ possibilities of encoding may be provided. If the quantity of codes is sufficiently high, a guarantee may be provided for achieving codes that are never repeated on a carrier used.

As shown in FIG. 3, an encoding element 3 includes: three second position detection patterns 31, a second encoding area 32, and markers 33. The second position detection pattern 31 is an alternately black and white circle. The second encoding area 32 is divided into a net with grids in a 10*10 form. The markers 33 are circular markers. The markers 33 are randomly distributed in the encoding area. Data of each grid is determined based on positions of circle centers of the markers 33. First grid 34 is a grid with the markers 33, corresponding to the code "1", while second grid 35 is a grid without the markers 33, corresponding to the code "0". The markers 33 are randomly distributed such that encoding information of the encoding element 3 is random.

The encoding information of the encoding element 3 is obtained based on the positions of the markers 33 in the encoding area. The specific encoding grids are shown in FIG. 5.

The second encoding area 32 may also be divided into grids in other formats. The encoding information of the encoding element 3 is obtained based on the positions of the markers 33 in the encoding area, and may also be determined based on dots of the markers 33, or based on central points of the markers 33, or based on the area coverage of the markers 33, etc. The complexity of the encoding information determines the anti-counterfeiting capability of the encoding element 3. The more complex the encoding information, the higher the anti-counterfeiting capability of the encoding element.

Figure 4:
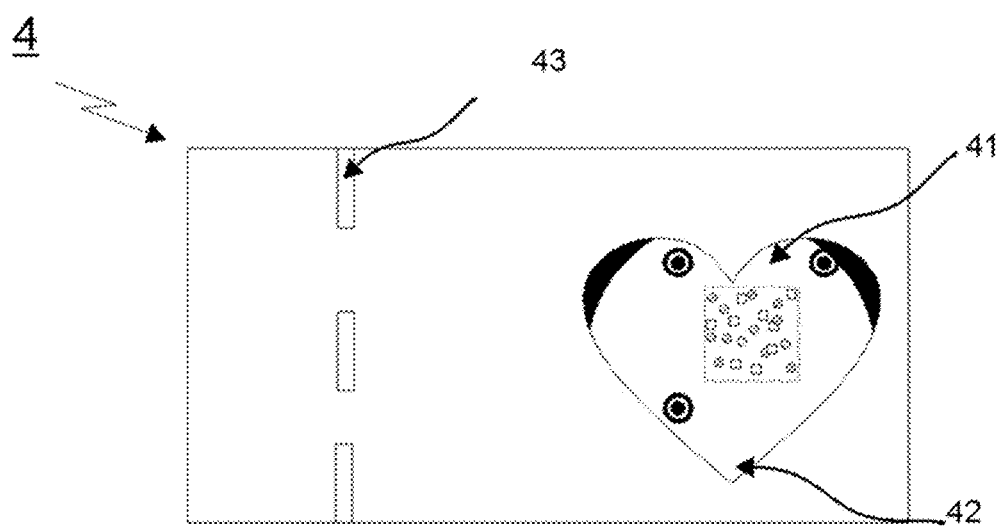
FIG. 4 is a schematic diagram of implementation of an encoding element according to the disclosure on a banknote.

FIG. 4 is a schematic diagram of implementation of an encoding element according to the disclosure on a banknote. As shown in the figure, the banknote 4 includes a windowed security thread 43, an encoding element 41, a second optically variable anti-counterfeiting element 42, and three position detection areas. An encoding area is provided with at least one group of markers, and at least one of attributes of markers in the same group is the same. The markers are randomly distributed, such that encoding information of the encoding element 41 is random. The encoding element 41 is a Fresnel relief mode. The encoding area and the position detection areas are all located in the second optically variable anti-counterfeiting element 42. The windowed security thread 43 also has an optically variable security feature, and have different colors when observed from different angles.

The encoding element may be used for high value-added items (for example, banknotes, particularly paper banknotes), polymer banknotes, or cards (for example, credit cards, bank cards, cash cards, authorization cards, product packaging, money orders, personal identity cards or personal particulars pages of passports).

The preferred implementations of the embodiment of the disclosure are described in detail above in combination with the accompanying drawings. However, the embodiments of the disclosure are not limited to the specific details of the above implementations. Within the scope of the technical concept of the embodiment of the disclosure, a variety of simple modifications may be made to the technical solutions of the embodiment of the disclosure, and these simple modifications belong to the protection scope of the embodiment of the disclosure.

In addition, it should be noted that the specific technical features described in the above detailed description may be combined in any suitable way without contradiction. In order to avoid unnecessary repetition, various possible combination methods will not be described separately in the embodiments of the disclosure.

In addition, different implementations of the embodiments of the disclosure may also be combined arbitrarily, and as long as the implementations do not violate the spirit of the embodiments of the disclosure, the implementations should also be regarded as the contents disclosed in the embodiments of the disclosure.

What is claimed is:

1. An encoding element, comprising:
   a printing stock, wherein the printing stock has an encoding area;
   at least one group of markers, wherein the at least one group of markers is provided on the encoding area, each of the at least one group of markers has a plurality of markers, each of the plurality of markers has at least one attribute, and at least one of the at least one attribute is the same as that in each of the at least one group of markers, the plurality of markers is randomly distributed, such that encoding information of the encoding element is random;
   an optically variable anti-counterfeiting element, wherein an operating principle of the optically variable anti-counterfeiting element is at least one of grating diffraction, reflection from a micro-reflective surface, surface plasmon resonance absorption, interference, color generation from a fixed height difference, sampling and amplification of micro-lens arrays, and Moire sampling and amplification of periodic micro-lens arrays;
   the at least one attribute comprises shapes, colors, sizes, graphics, and orientations;
   the colors comprise colors that appear at different observation angles.

2. The encoding element according to claim 1, wherein positions of the markers are randomly distributed in a non-presupposition manner.

3. The encoding element according to claim 1, wherein a transverse size of each of the markers ranges from 20 microns to 1000 microns, the transverse size being a distance between two points furthest apart on each of the markers; and a thickness of each of the markers ranges from 0.1 micron to 40 microns.

4. The encoding element according to claim 3, wherein a ratio of the transverse size of each of the markers to the thickness of each of the markers is greater than 5.

5. The encoding element according to claim 1, wherein the markers are randomly distributed in the encoding area by means of coating and/or printing.

6. The encoding element according to claim 1, wherein a plurality of markers are overlapped in the encoding area, a number of the plurality of markers is smaller than a preset value, the preset value being 10% of a number of total markers.

7. The encoding element according to claim 1, wherein the markers comprise one or more of metal coatings, dielectric coatings and plastic layers.

8. The encoding element according to claim 1, wherein the encoding element further comprises position detection pattern located on the printing stock, the position detection pattern is configured to determine a range of the encoding area.

9. The encoding element according to claim 1, wherein
   the encoding element comprises at least three position detection patterns; and/or
   the encoding area of the encoding element comprises at least ten markers.

10. The encoding element according to claim 1, wherein the encoding element further comprises an optically variable anti-counterfeiting element.

11. The encoding element according to claim 1, wherein the optically variable anti-counterfeiting element overlaps a position detection pattern and/or the encoding area.

12. The encoding element according to claim 1, wherein a pigment of the optically variable anti-counterfeiting element is an optically variable pigment and/or an optically variable magnetic pigment.

13. The encoding element according to claim 1, wherein the printing stock is at least one of paper, plastic and metal.

14. The encoding element according to claim 1, wherein a size of the encoding area is 1 mm$^2$-1000 mm$^2$.

15. An anti-counterfeiting product, wherein the anti-counterfeiting product comprises the encoding element according to claim 1.

16. The anti-counterfeiting product according to claim 15, wherein the anti-counterfeiting product comprises a banknote, an identity card, a bank card or a money order.

\* \* \* \* \*